Patented Mar. 31, 1931

1,798,533

UNITED STATES PATENT OFFICE

FRIEDRICH AUGUST HENGLEIN, OF COLOGNE-DEUTZ, GERMANY, ASSIGNOR TO I. G. FARBENINDUSTRIE AKTIENGESELLSCHAFT, OF FRANKFORT-ON-THE-MAIN, GERMANY

PROCESS FOR THE MANUFACTURE OF NITRATES

No Drawing. Application filed April 19, 1927, Serial No. 185,076, and in Germany May 4, 1926.

The present invention relates to the oxidation of nitrites to nitrates by means of oxygen or suitable gases containing free oxygen as air, at temperatures of about 300–500° C. in the presence of catalysts, such as alkali metal hydroxides or oxides of the alkaline earth metals.

By the reaction of oxygen on potassium nitrite practically no nitrate will be obtained, since the reaction velocity as expressed by the equation $2KNO_2 + O_2 = 2KNO_3$ is too small.

However, the reaction can be effected on a technical scale by the addition of the above mentioned catalysts, provided that at the same time care is taken to effect an intimate distribution of the nitrite and the catalyst.

The conditions under which a satisfactory result will be obtained are:

(1) Causing the catalyst or the nitrites to become liquid at a temperature of about 360° C.

(2) Distributing the finely divided nitrites in the liquid catalysts or the finely divided catalysts in the liquid nitrites.

According to my present invention oxygen or a gas containing oxygen is for instance caused to bubble through a melt of potassium nitrite and caustic potash at a temperature of 360° C. The nitrite is completely converted into nitrate in a short time. In a similar manner calcium oxide converts potassium nitrite quantitatively into potassium nitrate in contact with air at a temperature of 500° C.

Furthermore, according to my new process it is easily possible to manufacture potassium nitrate from gases containing the required nitrogen oxide and oxygen without the necessity of working in aqueous solution as is now the customary procedure. The gaseous mixture of NO and $O_2$ or air, such for example, as is obtained in the known manner by the oxidation of ammonia is passed into melted caustic potash at 350° C. with the immediate production of potassium nitrate. Sodium nitrate can be obtained in a similar manner with caustic sodium as catalyst.

The action of the catalysts below a temperature of 360° C. is rendered possible by the application of eutectic mixtures as for example of caustic potash and caustic soda, melting at 180° C.

Having now particularly described and ascertained the nature of my said invention and in what manner the same is to be performed I declare that what I claim is:

1. A process for manufacturing nitrates by reacting upon nitrites with oxygen in the presence of an alkali metal hydroxide as catalyst at temperatures of about from 300° to 500° C. at least one of the components of the reaction being in the fused state.

2. Process for manufacturing nitrates by reacting upon nitrites with oxygen in the presence of an eutectic mixture of caustic potash and caustic sodium at temperatures of about from 180° to 500° C. at least one of the components of the reaction being in the fused state.

3. Process for manufacturing potassium nitrate by reacting upon potassium nitrite with oxygen in the presence of caustic potash at temperatures of about from 300° to 500° C. at least one of the components of the reaction being in the fused stated.

4. A process for manufacturing nitrates by reacting upon nitrites at temperatures of about from 180° to 500° C. with oxygen in the presence of a catalyst of the group consisting of the alkali metal hydroxides, alkaline earth metal oxides and mixtures thereof, at least one of the components of the reaction being in the fused state.

5. The process for manufacturing potassium nitrate by reacting upon potassium nitrite with oxygen in the presence of caustic potash at a temperature of about 360° C., at least one of the components of the reaction being in the fused state.

In testimony whereof I affix my signature.

FRIEDRICH AUGUST HENGLEIN.